(12) United States Patent
Kosuga

(10) Patent No.: US 6,208,847 B1
(45) Date of Patent: Mar. 27, 2001

(54) RECEIVING CIRCUIT

(75) Inventor: Tadashi Kosuga, Kawagoe (JP)

(73) Assignee: Pioneer Electronic Corporation, Tokyo-To (JP)

( * ) Notice: Subject to any disclaimer, the term of this patent is extended or adjusted under 35 U.S.C. 154(b) by 0 days.

(21) Appl. No.: 09/287,974

(22) Filed: Apr. 7, 1999

(30) Foreign Application Priority Data

Apr. 13, 1998 (JP) .................................................. 10-101241

(51) Int. Cl.⁷ ....................................................... H04B 1/40
(52) U.S. Cl. ............................ 455/142; 455/143; 455/280
(58) Field of Search ..................................... 455/130, 140, 455/142, 143, 180.1, 188.1, 280, 283, 286, 287, 289, 290

(56) References Cited

U.S. PATENT DOCUMENTS 4,034,298 * 7/1977 McFadyen et al. .................. 455/143
4,461,034 * 7/1984 Ida ....................................... 455/283
4,907,292 * 3/1990 Leipert ................................. 455/280

* cited by examiner

Primary Examiner—Thanh Cong Le
(74) Attorney, Agent, or Firm—Ladas & Parry

(57) ABSTRACT

A receiving circuit includes: an antenna for receiving signal waves of two different frequency hands; a first receiving circuit for receiving a first receiving signal having a frequency; a second receiving circuit for receiving a second receiving signal having another frequency; a switch element for switching a signal path from the antenna to either one of the first receiving circuit and the second receiving circuit; a first diode; a second diode; and reverse bias voltage applying elements, each connected in parallel with one of the first diode and the second diode. The switch element is connected to a direct current power supply, and the switch element controls the connection of the direct current power supply such that the first diode and the second diode are biased in the forward direction when the first receiving signal is received and the first diode and the second diode are biased in the reverse direction when the second receiving signal is received.

7 Claims, 2 Drawing Sheets

RECEIVING CIRCUIT

BACKGROUND OF THE INVENTION

1. Field of the Invention

This invention relates to a receiving circuit for receiving signal inputted from the antenna with changing the path of the received signal in a receiver.

2. Description of the Prior Art

There is known a receiving circuit in which the signal path of the received signal can be changed in order to receive broadcasting waves in different frequency bands, such as the AM and FM bands, by a single antenna and switch the receiving circuits for those different frequency bands, or in order to operate a single receiving circuit with switching multiple antenna inputs, like the case of a diversity receiver.

Such a receiving circuit generally includes a pair of diodes connected in series. The connection point of those two diodes is connected to both an antenna output and an AM circuit, and the other terminal of one of the diodes is connected to an FM circuit. By appropriately changing the direction of the bias voltage applied to the serially-connected diodes, the signal received by the antenna is supplied either the AM circuit or the FM circuit. Thus, in a receiving circuit including a single antenna for a common use by an AM circuit and an FM circuit, the switching operation of the received signal can be readily controlled.

In such a receiving circuit, when the serially-connected diodes are applied with the reverse direction bias, a constant current flows the connection point of the two diodes if the characteristics of those diodes are ideal, i.e., ideally identical to each other. However, actually the characteristics of those diodes are not completely identical and hence the leak currents of different amount flow therethrough. This introduces the fluctuation of the reverse direction bias voltage. As a result, the AM circuit cannot receive constant voltage, and the distortion of the signal may take place in the AM circuit. In addition, the FM circuit becomes susceptible to the intermodulation interference due to the multiple FM transmission waves.

As described above, in a conventional receiving circuit, there are problems that the received signal is likely to be distorted due to the irregularity in characteristics of the diodes, such as the leak currents, and that it is difficult to maintain the desired signal receiving characteristics in both AM and FM circuits under the switching operation of them.

SUMMARY OF THE INVENTION

In order to overcome the above mentioned problems, it is an object of the present invention to provide a receiving circuit capable of avoiding the distortion of and/or interference to the received signal due to the irregularity in the characteristics of the individual diodes during the switching operation of the receiving signal frequency.

According to one aspect of the present invention, there is provided a receiving circuit including: an antenna for receiving signal waves of two different frequency hands; a first receiving circuit for receiving a first receiving signal having a frequency in one of the frequency bands; a second receiving circuit for receiving a second receiving signal having a frequency in the other one of the frequency bands; a switch element for switching a signal path from the antenna to either one of the first receiving circuit and the second receiving circuit; a first diode having an anode connected to an output terminal of the antenna and a cathode connected to an input terminal of the first receiving circuit; a second diode having a cathode connected to the output terminal of the antenna and an anode connected to the switch element; and reverse bias voltage applying elements, each connected in parallel with one of the first diode and the second diode for maintaining substantially identical reverse bias voltage between the anode and the cathode for each of the first diode and the second diode, wherein the switch element is connected to a direct current power supply, and the switch element controls the connection of the direct current power supply such that the first diode and the second diode are biased in the forward direction when the first receiving signal is received and the first diode and the second diode are biased in the reverse direction when the second receiving signal is received.

In accordance with the receiving circuit thus configured, when the first receiving signal having the frequency in one of the different frequency bands, such as FM transmission wave, is supplied from the antenna, the switch element controls the connection of the power supply such that the first diode and the second diode are biased in the forward direction. Thus, the first received signal is guided from the antenna to the first receiving circuit. On the other hand, when the second receiving signal having the frequency in the other one of the different frequency bands, such as AM transmission wave, is supplied from the antenna, the switch element controls the connection of the power supply such that the first diode and the second diode are biased in the reverse direction. At this time, the reverse bias applying elements apply substantially same reverse bias voltages between the anode and the cathode of the diodes. Therefore, the variation of the voltage level due to the irregularity in characteristics of the diodes, such as the leak currents, may be absorbed and the distortion in the received signal may be avoided. In addition, the interference of the received signal due to the intermodulation of the FM transmission waves may be reduced.

In a preferred embodiment, each of the reverse bias voltage applying elements may include a resistor connected in parallel with one of the first diode and the second diode, and the resistor may have a sufficiently large resistance value such that a current sufficiently larger than a leak current, which flows through the diode biased in the reverse direction, flows through the reverse bias voltage applying element. By this, the voltage of the power supply is divided by the resistors having appropriate resistance values, and thus the voltages applied between the anode and the cathode of the respective diodes are determined and stabilized. Therefore, if the individual characteristics, such as the leak current, of the diodes are different, the variation of the applied voltages of the diodes ay be avoided, and excellent reception performance may be ensured.

According to another aspect of the present invention, here is provided a receiving circuit including: a plurality of antennas including a common antenna for receiving signal waves of two different frequency hands; a first receiving circuit for receiving a first receiving signal having a frequency in one of the frequency bands; a second receiving circuit for receiving a second receiving signal having a frequency in the other one of the frequency bands; a switch element for switching a signal path from the common antenna to either one of the first receiving circuit and the second receiving circuit and for switching the connection of a signal path from one of the plurality of antennas other than the common antenna to the first receiving circuit; a first diode having an anode connected to an output terminal of the common antenna and a cathode connected to an input terminal of the first receiving circuit; a second diode having a cathode connected to the output terminal of the common antenna and an anode connected to the switch element; and reverse bias voltage applying elements, each connected in parallel with one of the first diode and the second diode for maintaining substantially identical reverse bias voltage between the anode and the cathode for each of the first diode and the second diode, wherein the switch element is connected to a direct current power supply, and the switch element controls the connection of the direct current power supply such that the first diode and the second diode are biased in the forward direction when the first receiving signal is received from the common antenna and the first diode and the second diode are biased in the reverse direction when the second receiving signal is received from the common antenna.

In accordance with the receiving circuit thus configured, when the first receiving signal having the frequency in one of the different frequency bands, such as FM transmission wave, is supplied from the common antenna, the switch element selects the common antenna and controls the connection of the power supply such that the first diode and the second diode are biased in the forward direction. Thus, the first received signal is guided from the common antenna to the first receiving circuit. On the other hand, when the second receiving signal having the frequency in the other one of the different frequency bands, such as AM transmission wave, is supplied from the common antenna, the switch element controls the connection of the power supply such that the first diode and the second diode are biased in the reverse direction. At this time, the reverse bias applying elements apply substantially same reverse bias voltages between the anode and the cathode of the diodes. Therefore, the variation of the voltage level due to the irregularity in characteristics of the diodes, such as the leak currents, may be absorbed and the distortion in the received signal may be avoided. In addition, the interference of the received signal due to the intermodulation of the FM transmission waves may be reduced.

In a preferred embodiment, each of the reverse bias voltage applying elements may include a resistor connected in parallel with one of the first diode and the second diode, and the resistor may have a sufficiently large resistance value such that a current sufficiently larger than a leak current, which flows through the diode biased in the reverse direction, flows through the reverse bias voltage applying element. By this, the voltage of the power supply is divided by the resistors having appropriate resistance values, and thus the voltages applied between the anode and the cathode of the respective diodes are determined and stabilized. Therefore, if the individual characteristics, such as the leak current, of the diodes are different, the variation of the applied voltages of the diodes may be avoided and excellent reception performance may be ensured.

Preferably, the receiving circuit may further include: a third diode having an anode connected to an output terminal of one of the plurality of antennas other than the common antenna and a cathode connected to the first receiving circuit; a fourth diode having a cathode connected to the output terminal of the one of the plurality of antennas and an anode connected to the switch element; and reverse bias voltage applying elements, each connected in parallel with one of the third diode and the fourth diode for maintaining substantially identical reverse bias voltage between the anode and the cathode for each of the third diode and the fourth diode, wherein the switch element further controls the connection of the direct current power supply such that the third diode and the fourth diode are biased in the forward direction when the first receiving signal is received from the one of the plurality of antennas. By this, when the first receiving signal is supplied from the one of the plurality of antennas other than the common antenna, the switch element selects that antenna and controls the connection of the power supply such that the third diode and the fourth diode are biased in the forward direction. Thus, the first received signal is guided from the antenna to the first receiving circuit. Thus, the diversity reception using one of the common antenna and the other antenna may be achieved.

For example, one of the frequency bands may be an FM transmission band and the other one of the frequency bands may be an AM transmission band.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

Figure 1:
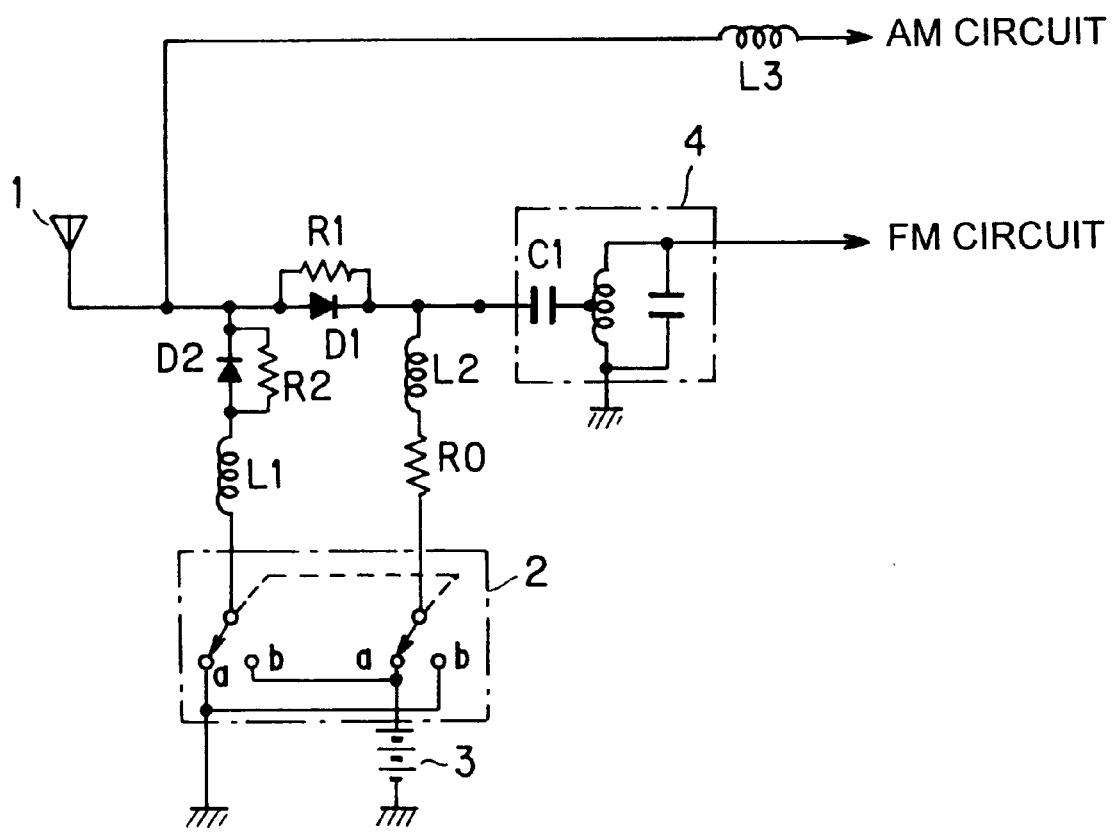
FIG. 1 is a circuit diagram showing a receiving circuit according to the first embodiment of the present invention.

FIG. 1 is a circuit diagram showing the receiving circuit according to the first embodiment of the present invention. In the first embodiment shown in FIG. 1, the present invention is applied to a receiving circuit for use in an on-vehicle tuner, which employs a single antenna for common use by an AM circuit and an FM circuit and which switches the AM circuit and the FM circuit. The receiving circuit shown in FIG. 1 includes an antenna 1, diodes D1 and D2, coils L1, L2 and L3, resistors R0, R1 and R2, a switching element 2, a power supply 3 and an FM antenna tuning circuit 4. In FIG. 1, the antenna 1 can receive the transmitted signal in both the AM transmission band and the FM transmission band and hence used in common by the AM circuit and the FM circuit. The received signal outputted by the antenna 1 is branched and coupled to both of the AM circuit and the FM circuit.

The switching element 2 carries out the switching control of the AM circuit and the FM circuit. The switching element 2 is switched to the b-terminal side when the FM circuit is to be selected, whereas the switching circuit 2 is switched to the a-terminal side when the AM circuit is to be selected. The switching element 2 is connected to the power supply 3 for applying a predetermined voltage, and to the ground. By the switching operation of the AM circuit and the FM circuit performed by the switching element 2, the relationship between the power supply 3 and the ground with respect to the remaining part of the circuit is reversed. To the diodes D1 and D2, the resistors R1 and R2 are connected in the parallel fashion, respectively. The resistance values of the resistors R1 and R2 are determined to be sufficiently large so that little current flows through the resistors R1 and R2 when the diodes D1 and D2 are being biased in the forward direction. However, the resistance values of the resistors R1 and R2 should be determined such that larger current than the leak currents of the diodes D1 and D2 can flow therethrough when the diodes D1 and D2 are being biased in the reversed direction. Namely, the resistance values of the resistors R1 and R2 are much larger than the forward direction resistance of the diodes D1 and D2 but much smaller than the reverse direction resistance of the diodes D1 and D2.

When the FM circuit is selected, the diodes D1 and D2 are biased by the power supply 3 via the switching element 2 in the forward direction and become on-state. At this time, at the parallel portion of the diode D1 and the resistor R1 and the parallel portion of the diode D2 and the resistor R2, the current supplied from the power supply 3 flows through the diodes D1 and D2, and hence the current supplied from the power supply 3 is limited and maintained to be constant by the resistance value of the resistor R0. When the AM circuit is selected, the diodes D1 and D2 are biased by the power supply 3 via the switching element 2 in the reverse direction and become off-state. Since the reverse direction resistance of the diodes D1 and D2 are quite large, the current supplied from the power supply 3 mainly flows through the resistors R1 and R2. Therefore, the voltage of the power supply 3 is divided by the resistors R0, R1 and R2, and thus the direct current voltage value of each connection points are determined. The values of the coils L1 and L2 are determined to be of high impedance against the FM received signal. Thus, the switching element 2 and the power supply 3 are separated and isolated from the remaining portion of the circuit in terms of high frequency signal component.

With the circuit configuration described above, the FM received signal supplied from the antenna 1 during the selection of the FM circuit passes through the diode D1, being biased in the forward direction, to the FM circuit. It is noted that the value of the coil L3 connected to the AM circuit in the serial fashion is determined to be of low impedance for the AM received signal and of high impedance for the FM received signal, thereby the FM received signal being cut off from the AM circuit. At this time, the current supplied from the power supply 3 via the switching element 2 passes through the coil L1, the diode D2, the diode D1, the coil L2 and the resistor R0 in this order, and hence the current value flowing therethrough can approximately be obtained by subtracting the forward direction voltages of the diodes D1 and D2 from the voltage of the power supply 3 and then dividing the voltage of the subtraction result by the resistance value of the resistor R0. On the other hand, almost all of the AM received signal supplied from the antenna 1 during the selection of the AM circuit passes to the AM circuit side because the diodes D1 and D2 are biased in the reverse direction. In addition, the FM antenna tuning circuit 4 includes a serially-connected capacitor C1, whose capacitance is determined so as to be of low impedance for the FM received signal and of high impedance for the AM received signal. Namely, the AM received signal is cut off from the FM circuit by both of the diode D1 and the capacitor C1.

Here, it is assumed that there is an irregularity in the characteristics of the diodes D1 and D2, i.e., the characteristics of the diodes D1 and D2 are not completely identical. When the diodes D1 and D2 are biased in the reverse direction, little amount of leak currents flow through the diodes D1 and D2. In response to the variation of the leak currents, the reverse bias currents flowing through the diodes D1 and D2 vary. In this embodiment, the resistors R1 and R2 are provided in parallel with the diodes D1 and D2, respectively, and the resistance values of the resistors R1 and R2 are determined to be substantially equal to each other. By this, even if there is an irregularity in the characteristics in the diodes D1 and D2, their reverse bias currents are substantially equal and thus stabilized. Namely, as already mentioned, since the current from the power supply 3 mainly flows through the resistors R1 and R2 during the reverse-bias state, the reverse bias voltages of the diodes D1 and D2 depend on the voltage drops by the resistors R1 and R2. Thus, the irregularity in the characteristics of the diodes D1 and D2 may be absorbed. At this time, the current supplied from the power supply 3 via the switching element 2 passes through the resistor R0, the coil L2, the resistor R1, the resistor R2 and the coil L1 in this order, the current value and the voltage levels of the respective points in this loop are determined by the resistance values of the resistors R0, R1 and R2. Thus, a constant direct current is always supplied to the connection point of the diodes D1 and D2, which is an input side of the AM circuit, and hence the distortion of the AM received signal may be avoided. Further, the AM circuit becomes less susceptible to the AM reception interference due to the intermodulation of multiple FM transmission waves.

Figure 2:
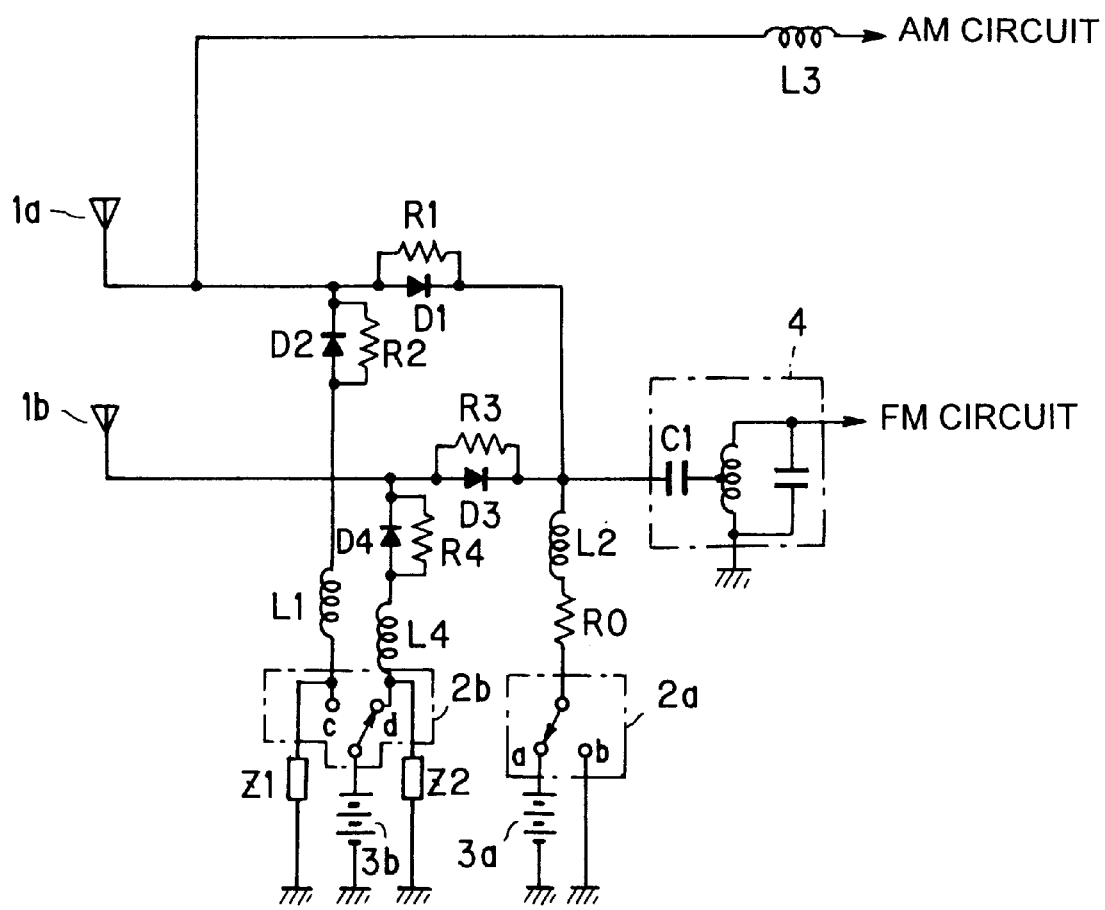
FIG. 2 is a circuit diagram showing a receiving circuit according to the second embodiment of the present invention.

FIG. 2 is a circuit diagram showing the receiving circuit according to the second embodiment of the present invention. In the second embodiment shown in FIG. 2, the present invention is applied to an antenna diversity receiving circuit for use in an on-vehicle tuner which switches the AM circuit and the FM circuit and includes a first antenna for common use for AM and FM reception and a second antenna only for FM reception. It is noted that, in the following description of the second embodiment, the elements in the receiving circuit identical to those in the receiving circuit of the first embodiment shown in FIG. 1 are denoted by the same reference numbers.

The receiving circuit shown in FIG. 2 includes a main-antenna 1a, a sub-antenna 1b, diodes D1, D2, D3 and D4, coils L1, L2, L3 and L4, resistors R0, R1, R2, R3 and R4, switching elements 2a and 2b, power supplies 3a and 3b, impedance elements Z1 and Z2, and an FM antenna tuning circuit 4. The main-antenna 1a can receive the transmission wave of both AM transmission band and the FM transmission band, and the sub-antenna 1b can receive only the transmission wave of the FM transmission band. For the FM reception, the diversity reception is performed by using the main-antenna 1a and the sub-antenna 1b. The received signal outputted by the main-antenna 1a is branched and coupled to both of the AM circuit and the FM circuit, whereas the received signal outputted by the sub-antenna 1b is coupled only to the FM circuit.

The switching elements 2a and 2b perform the switching control of the AM circuit and the FM circuit as well as the switching control of the FM diversity reception. When the AM circuit is to be selected, the switching element 2a is switched to the a-terminal side. Further, during the selection of the AM circuit, the power supply 3b is turned off so that no voltage is applied. When the FM circuit is to be selected, the switching circuit 2a is switched to the b-terminal side. In addition, the switching element 2b is switched to the c-terminal side if the main-antenna 1a is used, and the switching element 2b is switched to the d-terminal side if the sub-antenna 1b is used. The switching elements 2a and 2b are connected to the power supplies 3a and 3b for applying a predetermined voltage, respectively, and to the ground. The switching element 2b is further connected to the impedance elements Z1 and Z2 which serve as appropriate loads. By the switching operation of the switching elements 2a and 2b, the connection relation of the power supplies 3a, 3b and the ground via the impedance elements Z1, Z2 is reversed.

Similarly to the first embodiment, the diodes D1 and D2 are connected with the resistors R1 and R2, respectively.

Likewise, the diodes D3 and D4 are connected with the resistors R3 and R4 in the parallel fashion, respectively. The resistance values of the resistors R1 to R4 may be determined to be similar to those in the resistors R1 and R2 in the first embodiment.

First, when the FM circuit is selected and the diversity reception is carried out by the main-antenna 1a, the diodes D1 and D2 are biased by the power supply 3b in the forward direction to be on-state, and the diodes D3 and D4 are not biased. The current supplied from the power supply 3b mainly flows through the diodes D1 and D2. The current is limited by the resistance value of the resistor R0 to be a constant value.

When the FM circuit is selected and the diversity reception is carried out by the sub-antenna 1b, the diodes D1 and D2 are not biased, and the diodes D3 and D4 are biased by the power supply 3b in the forward direction to be the on-state. The current supplied from the power supply 3b mainly flows through the diodes D3 and D4, and the current is limited by the resistance value of the resistor R0 to be a constant value.

When the AM circuit is selected, all of the diodes D1 to D4 are biased by the power supply 3a via the switching element 2a in the reverse direction so that they all become off-state. The current supplied from the power supply 3a mainly flows through the resistors R1 to R4, and the direct current voltage values of the respective points are determined by the voltage drops in the resistors R0 to R4 and the voltage drops in the impedance elements Z1 and Z2. It is noted that the operation of the coils L1 to L3, the capacitor C1 and the FM antenna tuning circuit 4 is the same as the operation in the first embodiment shown in FIG. 1.

In the configuration shown in FIG. 2, when the FM circuit and the main-antenna 1a are selected, the inputted FM received signal passes through the forward-biased diode D1 to the FM circuit. The FM received signal is cut off from the power supply side by the coils L1 and L2 in terms of the high frequency component, and is also cut off from the AM circuit by the coil L3. When the FM circuit and the sub-antenna 1b are selected, the inputted FM received signal passes through the forward-biased diode D3 to the FM circuit. The FM received signal is cut off from the power supply side by the coils L2 and L4 in terms of the high frequency component, and is also cut off from the AM circuit by the coil L3. On the other hand, when the AM circuit is selected, the diodes D1 and D2 are biased in the reverse direction, and the capacitor C1 maintains high impedance for the AM received signal as described above, and therefore the inputted AM received signal passes to the AM circuit side almost completely. At this time, even if the characteristics of the diodes D1 to D4 have irregularity from one another, the reverse bias voltages of the diodes D1 to D4 may be substantially equalized and stabilized by appropriately setting the resistance values of the resistors R1 to R4. By this, the distortion of the AM received signal may be avoided, and the AM circuit becomes less susceptible to the AM reception interference due to the intermodulation of the multiple FM transmission waves.

In the above description, the present invention is applied to a receiving circuit for use with a single antenna for common use for AM and FM reception, and a receiving circuit for the combination of the common antenna for AM and FM reception with another antenna for FM diversity reception. However, the application of the present invention in not limited to this feature. For example, the present invention is applicable to the receiving circuit in which a single antenna is used to receive transmission waves of different frequency bands, or in which multiple antennas are switched.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 10-101241 filed on Apr. 13, 1998 including the specification, claims, drawings and summary is incorporated herein by reference in its entirety.

What is claimed is:

1. A receiving circuit comprising:
    an antenna for receiving signal waves of two different frequency bands;
    a first receiving circuit for receiving a first receiving signal having a frequency in one of the frequency bands;
    a second receiving circuit for receiving a second receiving signal having a frequency in the other one of the frequency bands;
    a switch element for switching a signal path from the antenna to either one of the first receiving circuit and the second receiving circuit;
    a first diode having an anode connected to an output terminal of the antenna and a cathode connected to an input terminal of the first receiving circuit;
    a second diode having a cathode connected to the output terminal of the antenna and an anode connected to the switch element; and
    reverse bias voltage applying elements, each connected in parallel with one of the first diode and the second diode for maintaining substantially identical reverse bias voltage between the anode and the cathode for each of the first diode and the second diode, wherein said switch element is connected to a direct current power supply, and said switch element controls the connection of the direct current power supply such that the first diode and the second diode are biased in the forward direction when the first receiving signal is received and the first diode and the second diode are biased in the reverse direction when the second receiving signal is received.

2. A receiving circuit according to claim 1, wherein each of the reverse bias voltage applying elements comprises a resistor connected in parallel with one of the first diode and the second diode, the resistor having a sufficiently large resistance value such that a current sufficiently larger than a leak current, which flows through the diode biased in the reverse direction, flows through the reverse bias voltage applying element.

3. A receiving circuit according to claim 1, wherein one of the frequency bands is an FM transmission band and the other one of the frequency bands is an AM transmission band.

4. A receiving circuit comprising:
    a plurality of antennas including a common antenna for receiving signal waves of two different frequency bands;
    a first receiving circuit for receiving a first receiving signal having a frequency in one of the frequency bands;

a second receiving circuit for receiving a second receiving signal having a frequency in the other one of the frequency bands;

a switch element for switching a signal path from the common antenna to either one of the first receiving circuit and the second receiving circuit and for switching the connection of a signal path from one of the plurality of antennas other than the common antenna to the first receiving circuit;

a first diode having an anode connected to an output terminal of the common antenna and a cathode connected to an input terminal of the first receiving circuit;

a second diode having a cathode connected to the output terminal of the common antenna and an anode connected to the switch element; and reverse bias voltage applying elements, each connected in parallel with one of the first diode and the second diode for maintaining substantially identical reverse bias voltage between the anode and the cathode for each of the first diode and the second diode, wherein said switch element is connected to a direct current power supply, and said switch element controls the connection of the direct current power supply such that the first diode and the second diode are biased in the forward direction when the first receiving signal is received from the common antenna and the first diode and the second diode are biased in the reverse direction when the second receiving signal is received from the common antenna.

5. A receiving circuit according to claim 4, wherein each of the reverse bias voltage applying elements comprises a resistor connected in parallel with one of the first diode and the second diode, the resistor having a sufficiently large resistance value such that a current sufficiently larger than a leak current, which flows through the diode biased in the reverse direction, flows through the reverse bias voltage applying element.

6. A receiving circuit according to claim 4, further comprising:

a third diode having an anode connected to an output terminal of one of the plurality of antennas other than the common antenna and a cathode connected to the first receiving circuit;

a fourth diode having a cathode connected to the output terminal of said one of the plurality of antennas and an anode connected to the switch element; and reverse bias voltage applying elements, each connected in parallel with one of the third diode and the fourth diode for maintaining substantially identical reverse bias voltage between the anode and the cathode for each of the third diode and the fourth diode, wherein said switch element further controls the connection of the direct current power supply such that the third diode and the fourth diode are biased in the forward direction when the first receiving signal is received from said one of the plurality of antennas.

7. A receiving circuit according to claim 4, wherein one of the frequency bands is an FM transmission band and the other one of the frequency bands is an AM transmission band.

* * * * *